Dec. 20, 1960 H. D. BREWER 2,965,696
APPARATUS FOR FORMING GLASS FIBERS
Filed Dec. 30, 1957 2 Sheets-Sheet 1
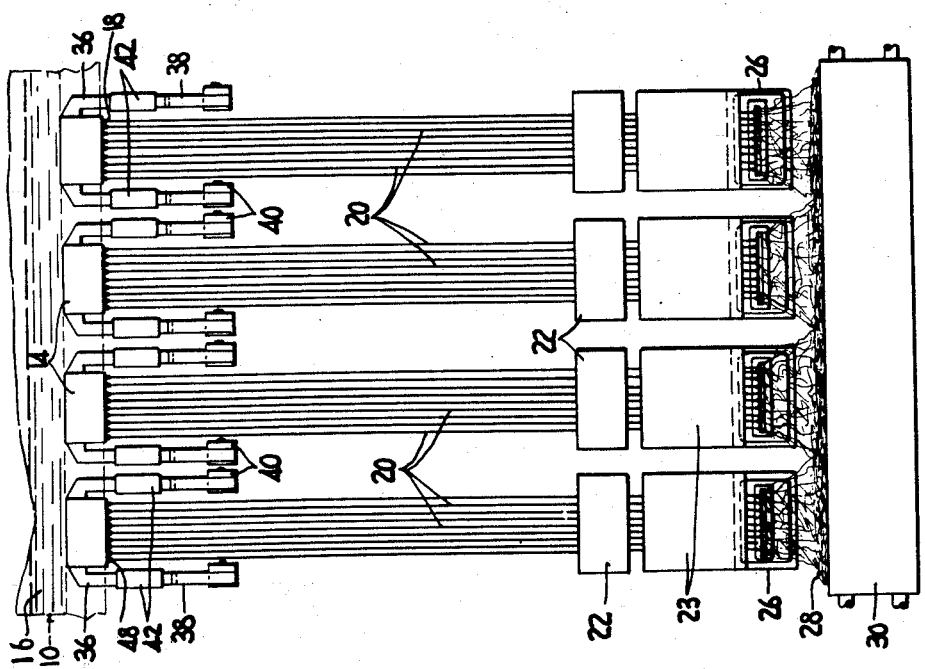
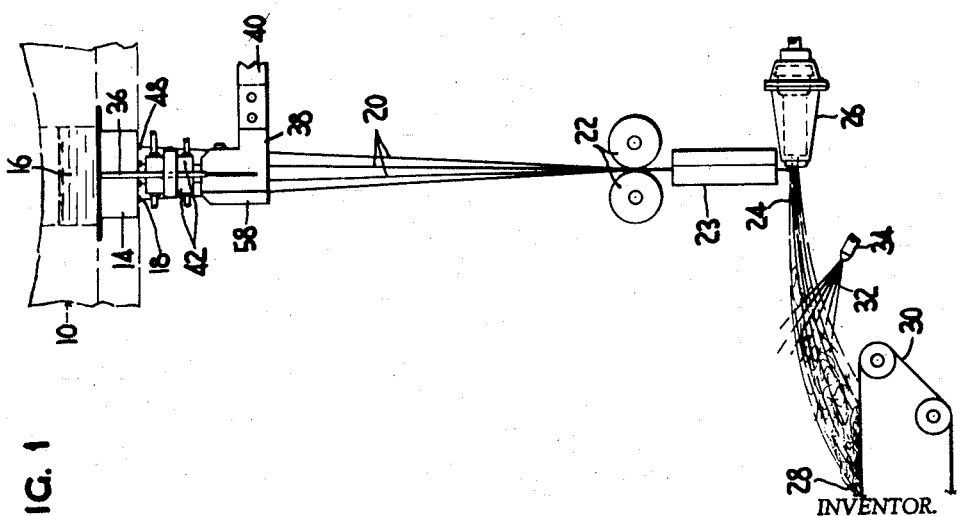
INVENTOR.
HAZEL D. BREWER
BY Oscar A. Spencer
ATTORNEY INVENTOR.
HAZEL D. BREWER
BY Oscar L. Spencer
ATTORNEY

United States Patent Office 2,965,696
Patented Dec. 20, 1960

2,965,696

APPARATUS FOR FORMING GLASS FIBERS

Hazel D. Brewer, Shelbyville, Ind., assignor to Pittsburgh Plate Glass Company, Allegheny County, Pa., a corporation of Pennsylvania Filed Dec. 30, 1957, Ser. No. 706,142

4 Claims. (Cl. 13—6)

This invention relates to metal feeders for use in forming glass fibers and it has particular relation to electrically heated metal feeders and to means for controlling the temperature of the feeders.

It is known to employ electrically heated metal feeders in apparatus suitable for manufacturing glass fibers. Such feeders have a plurality of small circular orifices in them through which the molten glass flows in the form of streams. The streams are subsequently attenuated into fibers. The feeder is made of a metal or alloy capable of withstanding the temperature of molten glass and it is capable of being heated to temperatures approximating fiber forming temperature of the glass by the passage of electric current through it. One alloy which has been employed to manufacture such feeders is a platinum-rhodium alloy containing about 87 to 90 percent platinum and 10 to 13 percent rhodium.

The feeder is in the form of a rectangular trough having flanges extending from the sides of the trough to support the feeder on surrounding refractory material. The orifices through which the glass passes are usually formed in rows in the bottom of the trough-like feeder. One to eight rows having from about 10 to 50 orifices in each row may be present in the bottom of the feeder. The diameter of the orifices may range from about .030 to .350 inch. Terminals in the form of strips of the platinum alloy are welded to opposite ends of the feeder. Due to their size relative to the feeder, the terminals would normally be heated to a temperature which is greater than desired in the feeder and this would cause the ends of the feeder adjacent the terminal connections to be hotter than the central portion of the feeder. To compensate for this, fluid cooled connectors are adjustably clamped to the ends of the terminals and also are adjustably attached to bus bars so that the terminals may be cooled and so that the feeder may be heated by the passage of electric current through it. This type of feeder has been employed in the manufacture of fine staple fibers according to the process shown in U.S. Patents Nos. 2,489,242 and 2,489,243 and in the manufacture of continuous strands according to the process shown in U.S. Patent No. 2,794,058.

The temperature and viscosity of the glass as it passes through the orifices in the feeder are critical factors in the formation of glass fibers. One of the problems in the formation of fibers according to either of the above processes is to maintain the temperature of the feeder uniform throughout its length. The temperature and viscosity of the glass passing through the orifices in the feeder may differ along the length of the feeder and the diameter of the fibers formed from the streams passing through the orifices will then be different. This is undesirable, for it makes it difficult to maintain control of the fiber forming process. It is especially undesirable in the process for forming short staple fibers. In order to obtain the maximum production in such process it is necessary that the primary fibers from which the short staple fibers are formed be of maximum, uniform diameter. It is undesirable in a continuous strand process, for the yarn formed does not conform to fiber diameter specifications.

Even though it may be possible to heat the feeder uniformly throughout its length, the viscosity of the glass may still vary from one orifice to another because of differences in the temperature and viscosity in the glass as it is supplied to the feeder. There are various ways in which the glass may be supplied to the feeder. The feeder may be located in a melting chamber to which either batch or cullet in the form of marbles is fed and melted. The feeder may also be in the bottom of a forehearth which extends from a tank which is continuously melting batch materials and/or cullet to form the glass. In either of these processes it is possible for the glass to be of non-uniform temperature and viscosity as it flows to and through the feeder.

It can be seen therefore that it is desired to have some method for adjustably controlling the temperature of the feeder so that the temperature and viscosity of the glass is substantially the same as it passes through each opening. One way which this has been accomplished in the past is to adjust the point of clamping of the connector to the terminal. It is believed that this changes the heat distribution in the feeder by varying the amount of current flowing through the feeder. This is described in U.S. Patent No. 2,794,058.

This method is unsatisfactory for it requires that the electrical contact be broken between the connector and the terminal during the time that the connector is being moved to a new point of clamping on the terminal. During this time no current flows through the feeder, the feeder is cooled by the surrounding atmosphere and the fiber forming process is interrupted. This interruption in the fiber forming process is especially disadvantageous in the method of forming staple fibers. In this method, a number of feeders are positioned in a line in a forehearth of a furnace. Primary rods are drawn from these feeders and attenuated into fine fibers by gaseous blasts issuing from a series of burners. When the flow of glass from one feeder is interrupted and then begun again, the primary rods formed from the feeder must be rethreaded in a guide which positions the primary rods and introduces them into the gaseous blast. Rethreading the primary rods is a tedious and time-consuming job. The glass fiber blanket which is produced from the other feeders during this rethreading of the primary rods from the one feeder must be discarded because it is non-uniform in fiber content and density.

It is therefore an object of this invention to provide a method of controlling or changing the temperature of the feeder during operation which does not require disconnecting the feeder from the source of electric current and a discontinuance of the fiber forming process. It is a further object of the invention to provide a more accurate, faster and simpler method of controlling the temperature of the feeder during operation than has heretofore been available.

In accordance with the present invention, an improved method of controlling the temperature of an electrically heated feeder is provided. This is accomplished by enlarging the terminals and extending the terminals to a length greater than they have been previously extended so that they are of a length sufficient to accommodate a means which can be adjustably fastened thereto between the connections of the terminal to the feeder and to the connector in order to cool the terminal. The adjustment of the cooling of the terminal is accomplished without interrupting the current flow through the feeder. Also, by increasing the size of the terminal, the temperature of the terminal is decreased and the amount of temperature control required is lessened. The details of the invention may be further described and understood by reference to the description of the drawings in which:

Fig. 1 is a diagrammatic elevation of an apparatus for forming glass fibers embodying the feeder and improved design for controlling the temperature of the feeder;

Fig. 2 is a side view of Fig. 1;

Figure 3:
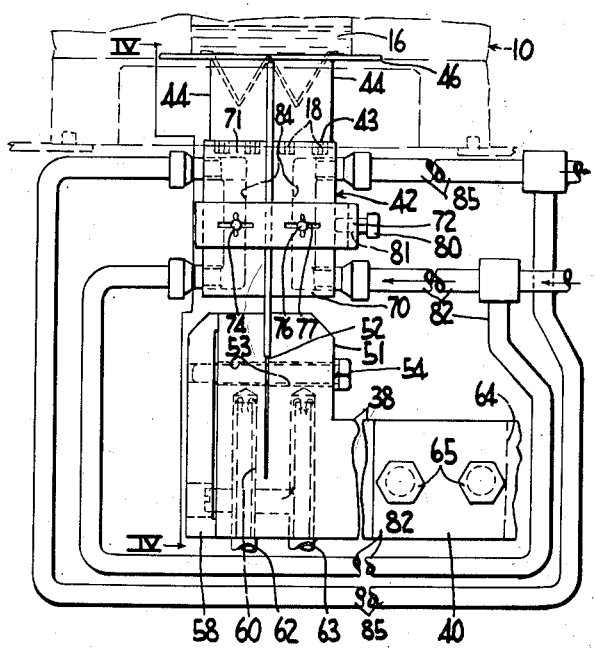
Fig. 3 is a sectional view of a portion of the apparatus shown in Fig. 2.

The invention is described with respect to a method and apparatus for forming staple, discontinuous fibers; however, as has been pointed out above, it is applicable to other methods and apparatus for forming fibers. In Figs. 1 and 2, a portion of a forehearth 10 of a continuous glass melting furnace is shown. The forehearth is formed of refractory blocks and it has a series of platinum alloy feeders 14 in the bottom of it. Molten glass 16 flows from the melting tank into the forehearth and through orifices 18 in the feeders 14. The glass solidifies just after it passes through the orifices and contacts the atmopshere. The solidified glass in the form of primary rods 20 is pulled away from the openings by means of juxtaposed, contacting, attenuating rollers 22 which grip the primary rods 20 and attenuate the glass streams coming through the orifices 18. These streams solidify and form into the attenuated primary rods 20. The rods 20 pass through grooves in a guide 23 into a blast 24 formed by a combustion chamber burner 26. The heat of the blast 24 melts the glass rods 20 and the velocity of the blast draws them out into very fine, discontinuous fibers 28 which are gathered in blanket form in a conveyor 30 according to conventional practices. A thermosetting, resinous binder 32 may be applied from spray means 34 to the fibers 28 as they pass through the air and prior to their being collected on the conveyor 30. The blanket may then be compacted and heated to cure the binder and bind the fibers to each other.

The invention is shown diagrammatically in Figs. 1 and 2 in conjunction with the fiber forming process just described. Platinum alloy terminals 36 are shown attached to the opposite ends of the feeders 14. The terminals 36 extend substantially vertically downward from the ends of the feeders 14. Silver clad, copper connectors 38 are clamped to the terminals at their lowermost portion and the connectors are bolted to bus bars 40. Cooling means 42 are shown adjustably connected to the terminals 36 at points approximately midway between the ends of the terminals.

Figure 4:
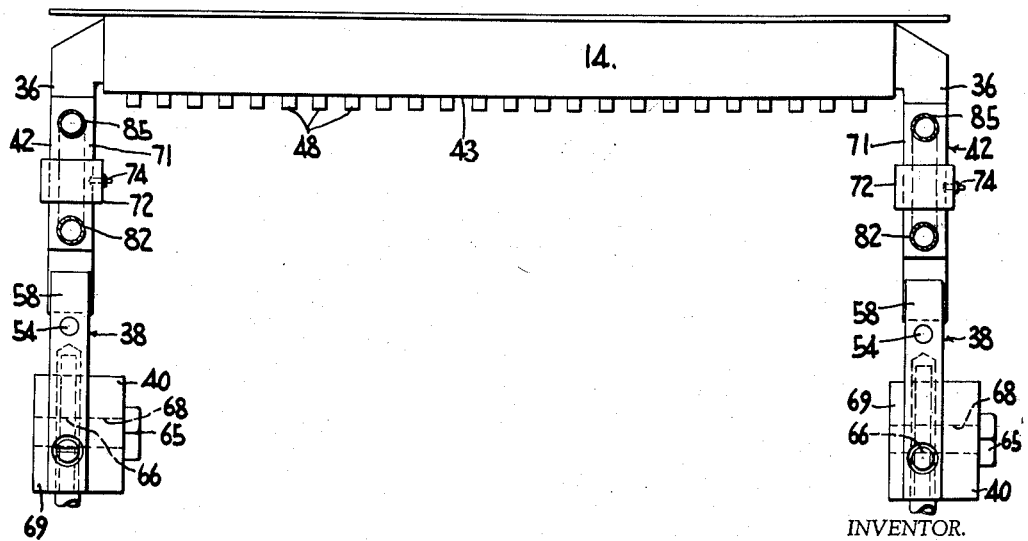
Fig. 4 is a sectional view of a portion of the apparatus shown in Figs. 2 and 3, taken along lines IV—IV.

The feeder, terminals, connectors and bus bars are shown in greater detail in Figs. 3 and 4. The feeder 14 is shown as a trough-like structure composed of a flat bottom portion 43 having sides 44 extending upwardly therefrom and terminating in horizontal flanges 46 extending outwardly from the sides 44. The feeder has a plurality of orifices 18 located in the form of rows in the bottom portion 43 of the feeder. The orifices are defined by tips 48 which extend a slight distance downwardly below the level of the bottom portion 43. The feeder is made of a platinum alloy containing about 87 to 90 percent platinum and 10 to 13 percent rhodium and having a thickness of about .020 to .080 inch. A wire screen made up of this alloy in the shape of a W is attached to the sides 44 of the feeder 14. The screen has a mesh which is sufficient to prevent stones in the glass from passing through it. The dimensions of the bottom portion of the feeder may be about 5 to 20 inches in length and 1 to 5 inches in width. The invention is particularly applicable to feeders which are longer than about 10 inches in length for the problem of maintaining uniform temperatures throughout the length of the feeder seems to be greater as the length of the feeder is greater.

The terminals 36 are welded to the side walls 44 at the opposite ends of the feeder 14. The terminals are in the form of metal strips which may be ½ to 2 inches wide, ⅛ to ¼ inch thick and which may extend 3 to 5 inches downwardly from the uppermost point of attachment to the end walls of the feeder. As such, they are different from the terminals conventionally employed heretofore which were ⅛ inch in thickness and 23/32 inch in width and which extended about 1 to 2 inches from the feeder and presented exposed portions below the level of the bottom portion of less than 1 inch. The length of the terminal was sufficient only to allow room for the connector to clamp onto the end of the terminal and be moved through a distance less than about an inch. The size of the terminals 36 is thus much greater in the improved form and this results in a lower temperature in the terminals as well as permitting room for the attachment of cooling means as will be hereinafter described.

The connectors 38 are adjustably clamped to the lowermost ends of the terminals 36. The connectors are of L shape with the upright portion 51 of the connector having a small vertical slit 52 therein extending downwardly from the top of the upright portion 51 of the connector 38. The slit is slightly greater in dimension for a portion of its vertical distance than the terminal 36 so that the terminal may be inserted in the slit. The upright portion 51 of the connector 38 is provided with openings 53 through which a bolt 54 is passed to connect with a plate-like element 58 which extends along one side of the upright portion 51 of the connector. The bolt 54 may be tightened or loosened to cause the element 58 to move toward or away from the two parts of the upright portion 51 of the connector on either side of the slit 52. This causes the clamping or releasing action of the upright portion with respect to the end of the terminal 36.

The upright portion 51 of the connector is cooled by means of a cooling fluid such as water which flows through passage 60 in the connector. The cooling fluid is provided to the passage 60 by means of inlet conduit 62. The fluid flows over the top of conduit 62 and through the passage 60 to the top of outlet conduit 63 and then flows out of the connector. The connector is attached at the end of its horizontal portion 64 to bus bar 40 by means of bolts 65 passing through openings 66 in the connector and openings 68 in the bus bar and fastening to plate 69 located on the opposite side of the connector from the bus bar. In this way, electric current is supplied to and passed through the various portions of the feeder to heat the feeder and the glass as it comes in contact with the feeder and passes through the orifices in the feeder.

A novel method of controlling the temperature of the feeder 14 is provided by cooling means 42 which is adjustably affixed to the terminal intermediate its attachment to the feeder and the connector. The cooling means 42 is composed of fluid cooled, plate-like elements 70 and 71 which are made of a heat conducting metal such as copper. The elements are held in spaced relation from each other and against terminal 36 by means of a stainless steel strap 72 which extends completely around the cooling elements. Cooling element 71 is rigidly attached to the strap by means of screws 74 which pass through the strap and into the element. Cooling element 70 is adjustably attached to the strap by means of screw 76 which passes through an elongated slot 77 in the strap and into the element. A set screw or bolt 80 passes through the strap at 81 into contact with the surface of element 70. Cooling element 70 is caused to move toward or away from cooling element 71 as the set screw is turned. Conduits 82 pass a cooling fluid such as water through passages 84 in the elements 70 and 71 and the fluid is removed from the elements through conduits 85. The cooling elements correspond approximately in width to the width of the terminal and they may extend about 1½ to 3 inches along the length of the terminal. The thickness of the elements should be sufficient to permit the formation of passages for carrying a cooling fluid through the elements and it may be ½ to 1 inch. This mounting of the cooling means 42 on the terminal provides a mechanism for easily attaching and releasing the cooling means for movement up and down the length of the terminal 36. The closer the cooling means 42 is located to the feeder 14, the greater is the cooling effect exerted on the end of the feeder which the cooling means is closest to. Except during the short time of adjustment, the cooling means must always be attached to the terminal and functioning as such, for without it, the elongated terminal becomes much too hot and the end of the feeder to which the terminal is attached becomes too hot.

Other mechanical means for attaching the cooling means to the terminal may be employed which are within the skill of the art, the only essential feature being that the cooling means be easily adjustable on the terminal without causing interruption of the current flow or dismembering of any of the portions of the circuit supplying the current to the feeder. The cooling means may consist of only one element such as cooling elements 70 and 71. Other shapes and forms of cooling elements may be employed in heat conducting relationship to the terminals.

The operation of the invention may be described with respect to a particular glass, however, it is applicable to many types of glasses which can be attenuated into fibers. A typical glass may contain 57 to 62 percent $SiO_2$, 14 to 15 percent $Na_2O$, 3.5 to 5.5 percent $Al_2O_3$, 4 to 4.5 percent $ZrO_2$, 7 to 8 percent $B_2O_3$, 7 to 9 percent $TiO_2$ and 1 to 5 percent F. Such glass has a softening point of about 1235° to 1240° F. The glass is formed continuously in a glass melting tank and is supplied to the feeder at a temperature of about 1600° to 2200° F. About 1400 to 3000 amperes current is supplied to the feeder at a voltage of about 1 to 6 volts so that the feeder reaches a temperature of about 1750 to 1800° F. as measured at a point along one side wall at the center of the feeder.

Primary rods 20 are pulled from the feeder by rollers 22 at a constant speed. A check on the diameter of the primary rods is made periodically during the fiber drawing operation. This check may be made by measuring the diameter of the rods from time to time. It can be made by visual observation such as by observing the color of the feeder. The feeder should have a uniform orange color throughout its length. Dark portions in the feeder indicate that that portion of the feeder is too cold, whereas light areas indicate where the feeder is too hot. The diameter of the primary rods may also be checked by observing the position of the end of the rod in the flame. If the diameter of the primary rod is too large, the end of the rod will be near the bottom of the flame or may protrude through the flame. This results in the production of "cold slugs" in the blanket. If the diameter of the primary rod is too small, the rod will be melted too fast and the end of the rod will just barely penetrate the flame. This results in the formation of beads.

The temperature of the feeder and the temperature of the glass passing through the feeder orifices should be maintained substantially constant. The temperature of the glass should be that temperature which will provide the largest diameter primary rod permissible for the subsequent fiberizing operation. When the feeder tends to overheat at one end or the other, the diameter of the primary rod at that end is larger than desired and when the feeder is too cold at one end or the other, the diameter of the primary rods at that end is smaller than desired. If one end of the feeder is too hot, the cooling means 42 may be released from its position on the terminal and moved upwardly towards the connection of the terminal to the feeder. This tends to draw heat from the end of the feeder and reduce its temperature to that temperature desired to provide uniform diameter fibers along the length of the feeder. Cooling water is provided at about 70° F. to the passages 84 at a rate sufficient to provide a substantial temperature differential between the cooling means and the terminal. It can be understood that the cooling means may be moved upwardly or downwardly along the terminals at either end of the feeder to obtain any heating pattern in the feeder which is consistent with the temperature and viscosity which is desired in the glass as it passes through the feeder. A very slight movement of the cooling means, for example ¼ of an inch up or down the terminal, is sufficient to effect a substantial change in the temperature of the end of the feeder.

As a result of the present invention, a way has been provided for controlling the temperature of a feeder along its length. This is accomplished by attaching cooling means to enlarged and elongated terminals. The cooling means may be adjustably connected to the terminals at various positions along their length. The position of connections may be changed without interrupting the current flow or the fiber forming process. The invention provides quick and accurate temperature control by means of very slight adjustments which can be easily made without interrupting production.

Although the present invention has been described with respect to specific details of certain embodiments thereof, it is not intended that such details shall be regarded as limitations upon the scope of the invention except insofar as included in the accompanying claims.

I claim:

1. An apparatus for feeding glass which comprises a metal feeder having a plurality of orifices therein and having a pair of elongated metal terminals extending therefrom so as to be out of contact with molten glass normally contained in the feeder, connectors attached to the terminals to connect the terminals with a source of electric current, and cooling means located separate and apart from the connectors and adjustably connected to the terminals for controlling the temperature of the terminals and the feeder without interruption of current flow through the feeder during adjustment of the adjustable cooling means.

2. An apparatus which comprises a metal feeder having a plurality of orifices therein and having a pair of elongated metal terminals extending therefrom so as to be out of contact with the molten glass normally contained in the feeder, connectors attached to the terminals to connect the terminals with a source of electric current, means for cooling the connectors at the portions thereof where they are attached to the terminals and cooling means located separate and apart from the connectors and cooling means therefor and adjustably connected to the terminals in heat conducting relationship therewith for controlling the temperature of the terminals and the feeder without interruption of current flow through the feeder during adjustment of the adjustable cooling means.

3. An apparatus for feeding glass which comprises a metal feeder having a plurality of orifices therein, a pair of elongated metal terminals connected to the feeder so as to be out of contact with the molten glass normally contained in the feeder, connectors attached to the terminals to connect the terminals with bus bars, said connectors having means for cooling the portions of the connectors where they are attached to the terminals, bus bars, and cooling means located separate and apart from the connectors and cooling means therefor and adjustably connected to the terminals for controlling the temperature of the terminals and the feeder without interruption of current flow through the feeder during adjustment of the adjustable cooling means.

4. An apparatus for feeding glass which comprises a platinum alloy feeder having a plurality of orifices therein, elongated platinum alloy terminals connected at opposite ends of the feeder and extending about 3 to 5 inches from the ends of the feeder so as to be out of contact with the molten glass normally contained in the feeder, connectors attached to the other end of the terminals to connect them with a source of electric current and cooling elements located separate and apart from the connectors and adjustably fastened to the terminals intermediate their end points for controlling the temperature of the terminals and the feeder without interruption of current flow through the feeder during adjustment of the adjustable cooling elements.

References Cited in the file of this patent

UNITED STATES PATENTS

| | | |
|---|---|---|
| 2,692,296 | Piolenc et al. | Oct. 19, 1954 |
| 2,736,759 | Penberthy | Feb. 28, 1956 |
| 2,794,058 | Russell | May 28, 1957 |

FOREIGN PATENTS

| | | |
|---|---|---|
| 692,442 | Great Britain | June 3, 1953 |